United States Patent
Shatdal

(10) Patent No.: US 8,943,058 B1
(45) Date of Patent: Jan. 27, 2015

(54) CALCULATING AGGREGATES OF MULTIPLE COMBINATIONS OF A GIVEN SET OF COLUMNS

(75) Inventor: Ambuj Shatdal, Madison, WI (US)

(73) Assignee: Teradata US, Inc., Dayton, OH (US)

( * ) Notice: Subject to any disclaimer, the term of this patent is extended or adjusted under 35 U.S.C. 154(b) by 581 days.

(21) Appl. No.: 12/637,274

(22) Filed: Dec. 14, 2009

(51) Int. Cl.
G06F 7/00 (2006.01)
G06F 17/30 (2006.01)

(52) U.S. Cl.
USPC .......................................................... 707/737

(58) Field of Classification Search
USPC .......................................................... 707/737
See application file for complete search history.

(56) References Cited

U.S. PATENT DOCUMENTS

| | | | |
|---|---|---|---|
| 5,640,584 A | | 6/1997 | Kandasamy |
| 5,659,725 A | | 8/1997 | Levy |
| 5,713,020 A | | 1/1998 | Reiter |
| 5,761,657 A | | 6/1998 | Hoang |
| 5,864,842 A | | 1/1999 | Pederson |
| 5,872,904 A | | 2/1999 | McMillen |
| 5,884,299 A | * | 3/1999 | Ramesh et al. ........................ 1/1 |
| 5,923,855 A | * | 7/1999 | Yamazaki ..................... 709/248 |
| 6,032,144 A | | 2/2000 | Srivastava |
| 6,505,189 B1 | | 1/2003 | On Au |
| 6,732,096 B1 | | 5/2004 | Au |
| 6,748,392 B1 | | 6/2004 | Galindo-Legaria |
| 6,757,677 B2 | | 6/2004 | Pham |
| 7,035,843 B1 | * | 4/2006 | Bellamkonda et al. ................ 1/1 |
| 7,472,117 B2 | * | 12/2008 | Dettinger et al. ..................... 1/1 |
| 7,725,455 B1 | | 5/2010 | Shatdal |

OTHER PUBLICATIONS

Peter Gulutzan and Trudy Pelzer, "SQL-99 Complete, Really," pp. 631-652 (1999).

* cited by examiner

*Primary Examiner* — Jacob F Bétit
*Assistant Examiner* — Christy Lin
(74) *Attorney, Agent, or Firm* — Trop, Pruner & Hu P.C.; Randy L. Campbell, Jr.

(57) ABSTRACT

In a database system having processing units, a request is received to calculate aggregates of multiple combinations of a given set of columns. The processing units are divided into multiple groups, where each of the multiple groups includes a corresponding subset of the processing units. Within each of the groups, data of each processing unit in the group is replicated to other one or more processing units in the group. Within each of the groups, aggregates of at least some of the multiple combinations of the given set of columns are calculated by the processing units in the group using the replicated data.

19 Claims, 3 Drawing Sheets

CALCULATING AGGREGATES OF MULTIPLE COMBINATIONS OF A GIVEN SET OF COLUMNS

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can be issued to insert new entries into a table of a database (such as to insert a row into the table), modify the content of the table, or to delete entries from the table. Examples of SQL statements include INSERT, SELECT, UPDATE, and DELETE.

Certain data analysis scenarios involve a computation of aggregates on a function of all column pair combinations. For example, a user may desire to compute the following aggregation: SUM(Ci*Cj) for all column combinations, for i=1 to K (K>1) and j=i to K. Thus, if there are 1000 columns (in other words, K=1000), then the possible range of values for i is 1 to 1000, and the possible range of values for j is i to 1000. As a result, there would be 500,500 aggregates of the function SUM(Ci*Cj).

In one example, it is assumed that the base table is T1(C1, ... , C1000) (in other words, the base table T1 has 1,000 columns C1 to C1000). A SQL query to compute the sums for all possible column combinations can be written as:

SELECT SUM(C1*C1), SUM(C1*C2), ... , SUM(C1000*C1000) FROM T1

However, the foregoing SQL query cannot be realistically computed on a general purpose database system, since a typical database system may not have sufficient processing power to handle such a large query in a time-efficient manner. Moreover, the amount of memory that is available to perform the calculation of aggregates may not be sufficient for efficient computation of the aggregates, which will result in excessive swapping of data between the memory and relatively slow persistent storage (e.g., disk-based storage).

SUMMARY

In general, according to an embodiment, a method for use in a database system having a plurality of processing units includes receiving a request to calculate aggregates of multiple combinations of a given set of columns, and dividing the plurality of processing units into multiple groups, where each of the multiple groups includes a corresponding subset of the processing units. Within each of the groups, data of each processing unit in the group is replicated to other one or more processing units in the group. Moreover, within each of the groups, aggregates of at least some of the multiple combinations of the given set of columns are calculated by the processing units in the group using the replicated data.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

Figure 1:
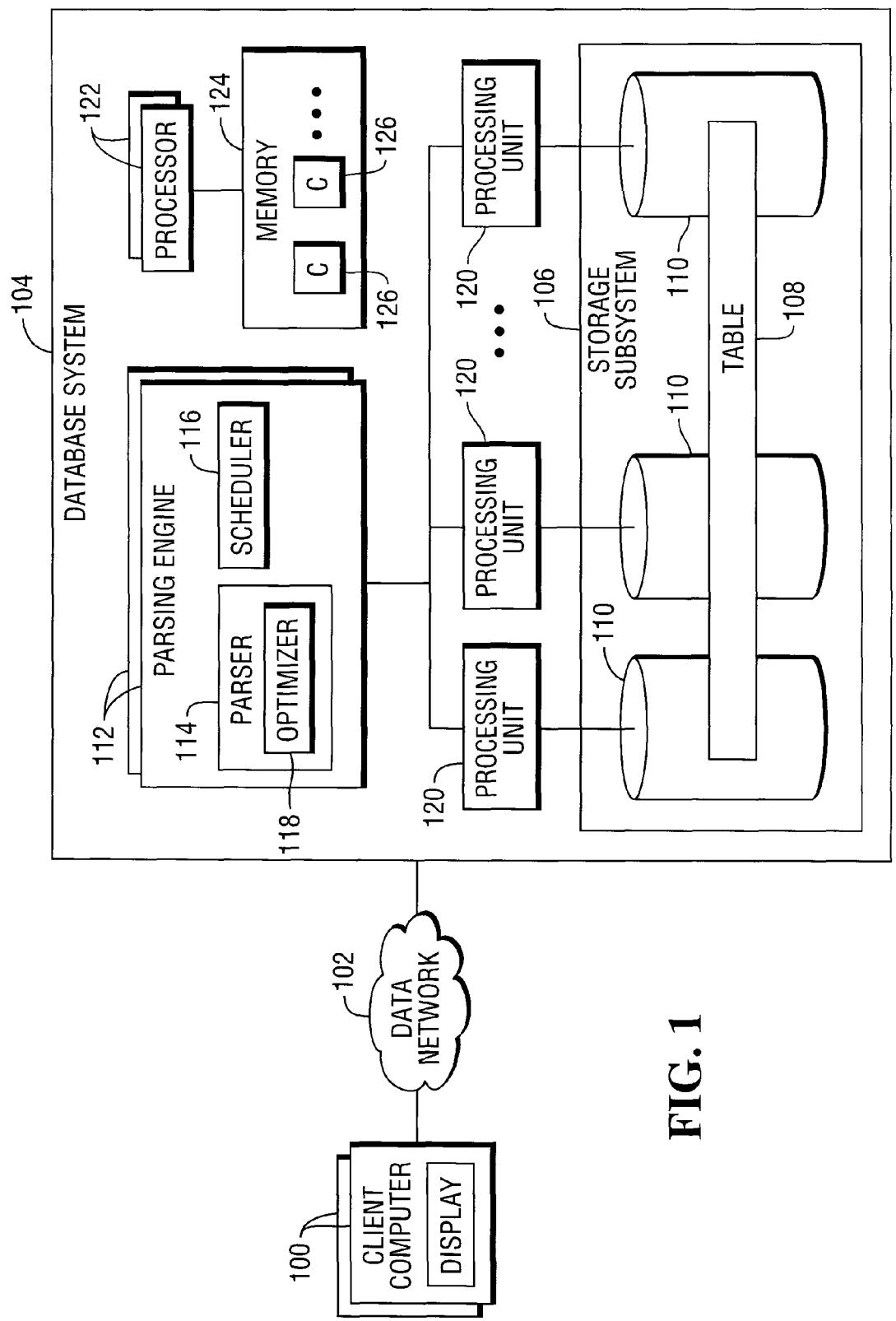
FIG. 1 is a block diagram of an example arrangement that includes client computers and a database system incorporating some embodiments of the invention.

In accordance with some embodiments, to calculate aggregates of multiple combinations of a given set of columns, an adaptive parallel algorithm is provided that exploits the processing units of a parallel database system to allow for an efficient calculation of the aggregates. One example of calculating aggregates for multiple combinations of a given set of columns is as follows: SUM(Ci*Cj) for all column combinations, for i=1 to K (K>1) and j=i to K. In the foregoing, the aggregates that are calculated are sums, where Ci represents one of K columns that may be present in a base table or other type of table or other data structure (e.g., view, index, etc.) in the database system. Although the foregoing example refers to calculating sums for multiple column combinations, it is noted that in other implementations, other forms of aggregates can be calculated, such as average, product, and so forth. Also, the foregoing example assumes that aggregates are to be calculated as a function of all column pair combinations of the following set of columns: C1, C2, ... CK. In alternative implementations, rather than calculating aggregates on all possible column pair combinations, aggregates are calculated for just a subset (less than all) of the column pair combinations. The same methodology could be extended to more than 2 column combinations.

To more efficiently calculate aggregates on the multiple combinations of a given set of columns, aggregation groups of processing units of the database system are identified. A "processing unit" of the database system refers to an element of the database system that performs query processing tasks associated with the database system. A "processing unit" can refer to a software module that is executable on hardware (such as one or more processors).

By identifying multiple aggregation groups of processing units, the calculation of aggregates can be divided among the aggregation groups, where each aggregation group includes a subset of the processing units in the database system. Within each aggregation group, data of one processing unit in the aggregation group is replicated to the other processing unit(s) of the aggregation group. Using the replicated data, the aggregates computed on corresponding column combinations can be calculated by the processing units in the aggregation group. By performing data replication among processing units of an aggregation group, the number of passes that have to be employed by the processing units in the aggregation group can be reduced. A "pass" refers to an iteration of aggregate calculation. In some implementations, to calculate aggregates, multiple iterations (passes) may have to be performed to properly compute aggregates on all desired column combinations. In accordance with some embodiments, data replication within each aggregation group is employed to reduce the number of passes that have to be performed to calculate the aggregates on the desired column combinations.

It is noted that, by dividing the processing units into aggregation groups, the amount of data replication is reduced as compared to an implementation in which all data of all processing units have to be replicated to all other processing units of the entire system.

The size of each of the aggregation groups is determined based on the number of processing units in the database system and a cache size available to each of the processing units. "Cache size" refers to an amount of memory that can be used by the processing unit to perform the data aggregation. The number of passes that is used for performing the aggregates is based on the number of column combinations specified by the query and the cache size.

In general, a two-stage aggregation algorithm is employed, in which the first stage performs the calculation of the aggregates in the corresponding aggregation groups discussed above. The partial aggregates calculated by processing units in the corresponding aggregation groups are distributed to other processing units according to a distribution procedure according to some embodiments. The processing units that receive the partial aggregates then perform further aggregation in the second stage of the two-stage aggregation algorithm to calculate the final aggregates, which are then combined and output as the aggregation result.

FIG. 1 illustrates an example arrangement in which a client station (or plural client stations) 100 is (are) coupled to a database system 104 over a data network 102. Examples of the data network 102 include a local area network (LAN), a wide area network (WAN), the Internet, and so forth. Each client station 100 is capable of issuing queries according to a standard database query language to the database system 104 to access or update data or to create or alter data structures (e.g., tables, databases, views, and so forth). One example of a standard database query language is SQL, as promulgated by the American National Standards Institute (ANSI).

The database system 104 includes a storage subsystem 106 that stores various data, including relational tables 108. Each relational table 108 contains rows and columns. The storage subsystem 106 includes plural storage modules 110, which can be physical storage devices or logical representations of partitions of the storage subsystem 106.

The database system 104 also includes one or more parsing engines 112, each having a parser 114 and a scheduler 116. The parser 114 receives database queries (such as those submitted by the client stations 100), parses each received query, and generates executable steps for the parsed query. The parser 114 includes an optimizer 118 that generates query plans in response to a query, selecting the most efficient from among the plural query plans. The scheduler 116 sends the executable steps generated by the parser 114 to multiple processing units 120 in the database system 104.

In some implementations, each processing unit 120 can perform the following tasks: inserts, deletes, or modifies contents of tables; creates, modifies, or deletes definitions of tables; retrieves information from definitions and tables; and locks databases and tables. In one example, each processing unit 120 is based on an access module processor (AMP) used in some TERADATA® database systems from Teradata Corporation. Each processing unit 120 manages access of data in respective storage modules 110. The presence of multiple processing units 120 and corresponding storage modules 110 define a parallel database system.

The processing units 120 and parsing engine(s) 112 are part of the database software executable in the database system 104. The database software is executable on one or more processors 122 of the database system 104. The processor(s) 122 is (are) connected to a memory 124.

In the example of FIG. 1, the components of the database system 104 are depicted as being part of one computer node. Note that the database system 104 can actually be implemented in a multi-node system, where each of the computer nodes contains one or more processing units 120 and parsing engines 112 (and corresponding one or more processors 122) to provide a distributed database architecture.

The memory 124 can be implemented with one or more memory devices, such as the random access memories (DRAMs), flash memories, or other types of semiconductor or integrated circuit memory devices. Alternatively, the memory 124 can be implemented using disk-based storage that has higher access speeds than the storage media used to implement the storage subsystem 106.

Portions of the memory 124 are allocated to be used as caches 126 allocated to respective processing units 120. The caches 126 are used to store data on which database operations are to be applied, such as the aggregate calculations discussed above, sort operations, merge operations, join operations, and so forth.

If all cache space (memory) that is needed for calculating aggregates on the desired combinations of the columns can fit into each of the caches 126 allocated to corresponding processing units 120, then only a single pass would be needed to calculate the aggregates discussed above. However, if the size of the cache 126 allocated to each processing unit 120 is insufficient to store all data needed to calculate the aggregates assigned to the corresponding processing unit, then multiple passes would have to be employed. The number of passes that would be needed depends upon the total number of column combinations, the available size of the caches 126, and the number of processing units in the system, discussed in further detail below.

Figure 2:
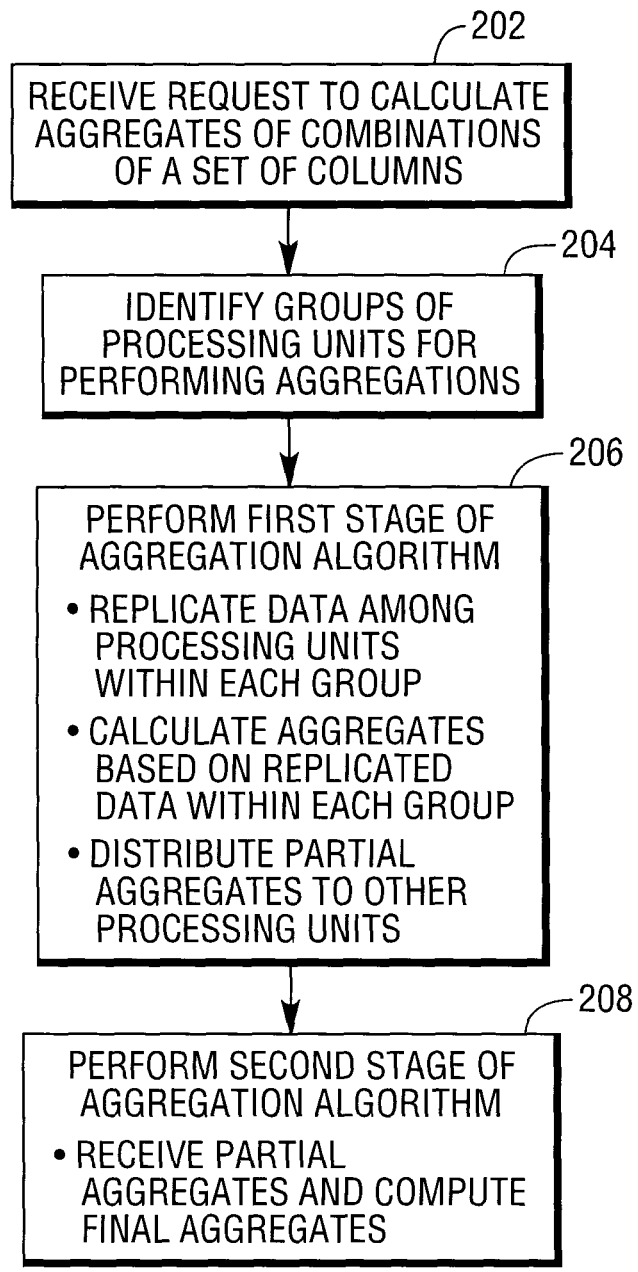
FIG. 2 is a flow diagram of a process of calculating aggregates using a technique according to an embodiment.

FIG. 2 is a flow diagram of a process of calculating aggregates according to an embodiment. The process of FIG. 2 can be performed by the parser 114 and/or the optimizer 118 in the parsing engine(s) 112 in the database system 104. A request is received (at 202) to calculate aggregates of combinations of a set of columns. For example, the request can specify that aggregates are calculated on all column pair combinations, such as according to the following: SUM ($C_i * C_j$) for all column combinations, for i=1 to K (K>1) and j=i to K. In the foregoing example, if there are 1000 columns (K=1000), then i would range between 1 and 1000 and j would range between 1 and 1000, and the number of aggregates to be computed would be 500,500.

The database system 104 next identifies (at 204) the aggregation groups of processing units for calculating the desired aggregates, where each aggregation group includes a corresponding subset of the processing units 120 in the database system 104.

Next, the database system 104 performs (at 206) the first stage of the aggregation algorithm. In the first stage, within each aggregation group, data of each processing unit is replicated to the other processing unit(s) within the group. Within each aggregation group, the aggregates are then calculated by the processing units in the aggregation group based on the replicated data. Partial aggregates are then distributed to other processing units using a distribution algorithm discussed further below. The distribution algorithm used according to some embodiments is designed to send the partial aggregates to different processing units such that the second stage of the aggregation algorithm could be made more efficient.

Next, the second stage of the aggregation algorithm is performed (at 208). In the second stage, the partial aggregates are received by processing units, and the final aggregates are computed and combined to produce the final aggregation result.

The following provides a discussion of further details regarding identifying aggregation groups and number of passes for calculating aggregates on multiple column combinations. The number of aggregation groups is defined by the parameter AMPGroups. The size of each of the aggregation groups is represented by the following parameters AMPGroupSize[0], AMPGroupSize[1], ..., AMPGroupSize[AMPGroups−1], where AMPGroupSize[k], k=1 to AMPGroups−1, represents the size of AMPGroup k. The number of passes is represented by the following parameter: nPasses.

The number of columns whose combinations are to be aggregated is represented as K. The total number of column combinations is represented by N, where N is calculated as follows: K*(K+1)/2. The size of the cache per processing unit is represented as M, and the number of processing units in the database system is represented as A.

The number of aggregation groups, AMPGroups, is calculated as AMPGroups=Max(Floor(A/MaxAMPGroupSize), 1), where MaxAMPGroupSize=Ceil(N/M). The function Ceil( ) is a ceiling function that rounds up the value of N/M to the next highest integer. The Floor( ) function is a floor function that rounds down the value of A/MaxAMPGroupSize to the next lowest integer. The Max( ) function takes the maximum value of 1 and Floor (A/MaxAMPGroupSize). Intuitively, the parameter MaxAMPGroupSize specifies the maximum size (number of processing units in the aggregation group) of each aggregation group.

It is noted that it is possible that the number of processing units in the database system 104 are not exactly divisible by the number of aggregation groups, such that there would be some extra processing units that are not assigned to aggregation groups.

To allocate these extra (overflow) processing units, the following parameters are defined. A parameter MinAMPsPerGroup=Floor(A/AMPGroups) represents a minimum number of processing units per aggregation group, and a parameter OverflowGroups=A mod AMPGroups represents the number of extra (or overflow) processing units that are left over from dividing the number of processing units (A) by the number of aggregation groups (AMPGroups). Each aggregation group size is initially defined as follows: AMPGroupSizes[0, ..., (AMPGroups−1)]=MinAMPsPerGroup. Then, for (i=0; i<OverflowGroups), AMPGroupSizes[i]+=1, which effectively allocates the extra (overflow) processing units to some of the aggregation groups.

The number of passes is calculated as follows:

$n\text{Passes}=\text{Ceil}(\text{MaxAMPGroupSize}/A).$

The number of passes is thus equal to the maximum aggregation group size divided by the number of processing units, rounded up to the next integer.

The following table summarizes some of the parameters discussed above.

| | |
|---|---|
| K | Number of Columns to Be Aggregated |
| N | Total number of column combinations |
| M | Size of cache for each processing unit, expressed as number of entries in the memory |
| AMPGroups | Number of aggregation groups |
| A | Number of processing units in system |
| nPasses | Number of passes |

There are various different scenarios associated with the calculation of the aggregates according to some embodiments. The first scenario involves N (number of column combinations) being less than or equal to M (number of cache entries for each processing unit), in which the cache 126 (FIG. 1) associated with each processing unit being of sufficient size for aggregating all processing unit resident data. In this scenario, aggregate calculating techniques according to some embodiments do not have to be employed.

Another possible scenario is the case where nPasses is equal to 1, which means that each aggregation group has sufficient memory to handle the data resident in the aggregation group, and that a data resident on each processing unit in the aggregation group is also replicated to the other processing units in the aggregation group.

A third scenario involves nPasses being greater than 1, in which all processing units work together to process the data. The source data is broadcast to all the processing units in each aggregate group, and each pass handles as many column combinations as possible.

Each processing unit knows, among other information, the range of aggregates (combinations) that the processing unit is responsible for. The processing unit also knows its aggregation group and members of its aggregation group, the number of passes (nPasses), and its allocated memory or cache size (M).

Figure 3:
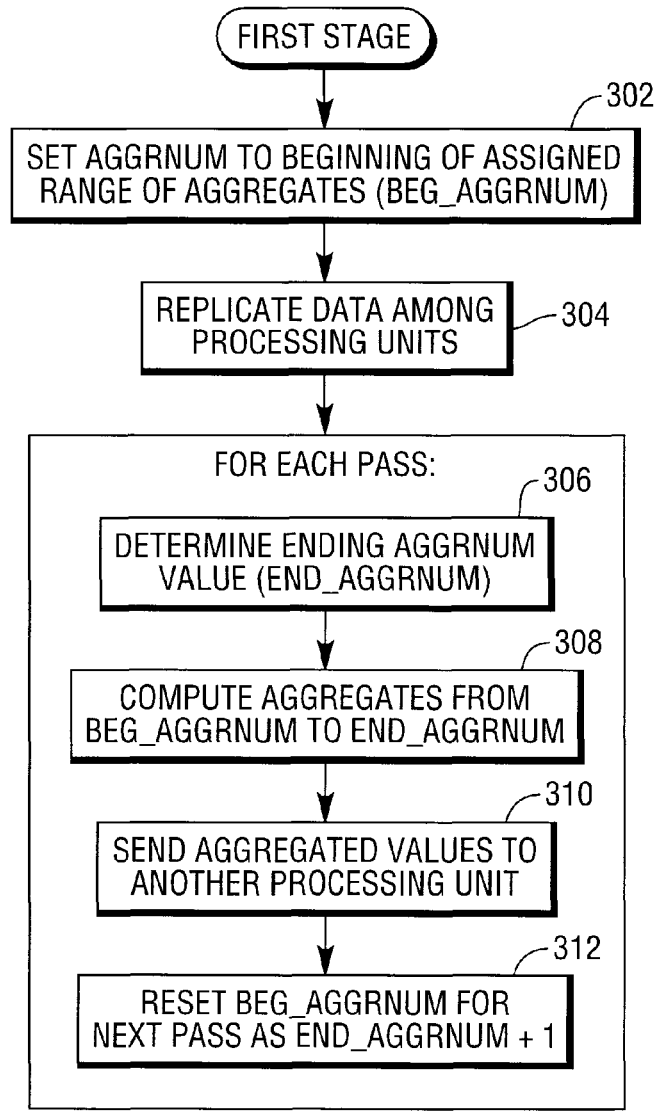
FIG. 3 is a flow diagram of a process of performing calculation of aggregates in a first stage of a two-stage aggregation algorithm, according to an embodiment.

FIG. 3 depicts the first stage of the aggregation algorithm in more detail. The following refers to tasks performed by each of multiple aggregation groups. A variable AGGRNUM is initially set (at 302) to the beginning (referred to as BEG_AGGRNUM) of an assigned range of aggregates. Each value of AGGRNUM represents a respective column combination. As discussed further below, the value of the variable AGGRNUM is incremented from BEG_AGGRNUM to an ending value (END_AGGRNUM) when calculating aggregates for corresponding different column combinations.

Next, data of each processing unit within each aggregation group is replicated (at 304) to the other processing unit(s) of the aggregation group.

For each pass (from among the number of passes defined by nPasses), the following is performed. The ending AGGRNUM value is determined for this pass (at 306). The ending AGGRNUM value (represented by END_AGGRNUM) is equal to BEG_AGGRNUM+M−1, where M is the size of the cache 126.

Each processing unit then computes (at 308) aggregates for corresponding column combinations, indicated by incrementing AGGRNUM from BEG_AGGRNUM to END_AGGRNUM. The computation of aggregates can use any one of several possible aggregation techniques, such as hash-based aggregation. The aggregation performed by each processing unit aggregates rows by reading local data of the processing unit as well as replicated rows received from other processing units in the aggregation group. The aggregate values (which are the partial aggregates) are then sent (at 310) to other processing units according to a distribution algorithm, to perform the second stage of the aggregation algorithm. In some embodiments, the target processing units to which the partial aggregate values calculated by a particular processing unit are to be sent is based on applying a hashing function of the corresponding AGGRNUM values (representing corresponding column combinations). Thus, the particular processing unit can send partial aggregates for different column combinations to different target processing units.

Next, the BEG_AGGRNUM for the next pass (if applicable) is reset (at 312) as END_AGGRNUM+1, and the process of 306-312 is repeated for the next pass. Note that in implementations in which there is just one pass, then the tasks 306-312 are performed just once.

Figure 4:
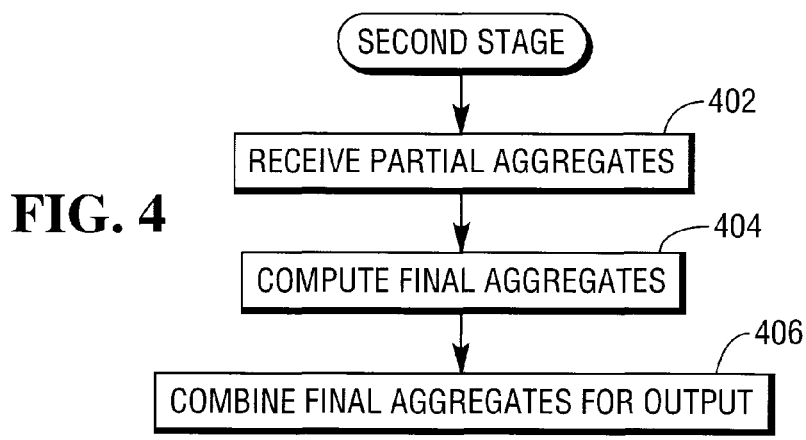
FIG. 4 is a flow diagram of a process of performing calculation of aggregates in a second stage of the two-stage aggregation algorithm, according to an embodiment.

FIG. 4 depicts a flow for performing the second stage of the aggregation algorithm. Each processing unit performs the following. The processing unit receives (at 402) partially aggregated rows (computed in the first stage) for each aggregate combination (indicated by AGGRNUM). Note that each processing unit would receive also the aggregation group number associated with the partially aggregated rows that the processing unit receives.

The final aggregate value for each column combination is then computed (at 404) using any one of several possible aggregation algorithms, such as hash-based aggregation. The aggregation result is spread across the processing units and can be combined (at 406) together to create the final output.

Instructions of software described above (including parsing engine(s) 112 and processing units 120 of FIG. 1) are loaded for execution on a processor (such as one or more processors 122 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a database system having a plurality of processing units, comprising:
   receiving a request to calculate aggregates of multiple column combinations of a given set of columns, wherein each aggregate is requested to be calculated from a respective column combination of the multiple column combinations;
   dividing the plurality of processing units into a number of groups, wherein each of the groups includes a respective subset of the processing units, and wherein the number of groups is based on a total number of the multiple column combinations of the given set of columns, a number of the plurality of processing units, and a size of cache memory per processing unit;
   determining a predetermined number of passes to calculate the aggregates by each of the groups, wherein the number is one or greater, wherein the predetermined number of passes is determined prior to calculation of the aggregates by each of the groups;
   within each of the groups, replicating data of each processing unit in the group to other one or more processing units in the group; and
   within each of the groups, calculating aggregates of at least some of the multiple column combinations of the given set of columns by the processing units in the group using the replicated data, wherein the processing units in each group are executable on one or more processors.

2. The method of claim 1, wherein receiving the request to calculate aggregates of the multiple column combinations of the given set of columns comprises receiving the request to calculate aggregates of all column combinations or a subset of all column combinations of the given set of columns.

3. The method of claim 1, wherein determining the predetermined number of passes is based on a cache size available to each of the processing units, the total number of the multiple column combinations, and a number of the processing units.

4. The method of claim 1, wherein calculating the aggregates is part of a first aggregation stage.

5. The method of claim 4, further comprising sending the aggregates calculated in the first aggregation stage by each of the processing units to another one of the processing units to perform a second aggregation stage by the another processing unit.

6. The method of claim 5, further comprising:
   a given one of the processing units applying a function on a predefined parameter to identify another one of the processing units to which aggregates calculated by the given processing unit are to be sent for performing the second aggregation stage.

7. The method of claim 6, wherein applying the function on the predefined parameter comprises applying the function on a variable that is incremented through a range of values to represent corresponding column combinations.

8. The method of claim 5, further comprising:
   computing, by the processing units that received the aggregates calculated in the first aggregation stage, further aggregations in the second aggregation stage.

9. The method of claim 1, wherein calculating the aggregates by each given processing unit in a particular one of the groups comprises calculating the aggregates by the given processing unit in the particular group using local data of the given processing unit and replicated data from other one or more processing units in the particular group.

10. A database system, comprising:
    one or more processors;
    a plurality of processing units executable on the one or more processors; and
    the one or more processors configured to:
    receive a query that specifies calculation of aggregates of multiple column combinations of a given set of columns, wherein each aggregate is specified to be calculated from a respective column combination of the multiple column combinations;
    identify plural groups of the processing units, wherein each of the groups includes a respective subset of the processing units, and wherein the number of plural groups is based on a total number of the multiple column combinations of the given set of columns, a number of the plurality of processing units, and a size of cache memory per processing unit;
    determine a predetermined number of passes to calculate the aggregates by each of the groups, wherein the number is one or greater, wherein the predetermined number of passes is determined prior to calculation of the aggregates by each of the groups;

within each of the plural groups, replicate data of each processing unit in the group to other one or more processing units in the group; and within each of the plural groups, calculate aggregates of at least some of the multiple column combinations of the given set of columns by the processing units in the group using the replicated data.

11. The database system of claim 10, wherein the aggregates are calculated in a first aggregation stage.

12. The database system of claim 10, wherein the number of passes is based on the total number of the multiple column combinations and the cache size.

13. The database system of claim 10, wherein the one or more processors are further configured to calculate aggregates of the multiple column combinations of the given set of columns using a two-stage aggregation algorithm that includes a first stage and a second stage, wherein replication of the data for calculation of aggregates within each of the plural groups are performed in the first stage.

14. The database system of claim 13, wherein aggregates calculated in the first stage are distributed to at least some of the processing units for performing further aggregation in the second stage to calculate the aggregates of the multiple column combinations of the given set of columns.

15. The database system of claim 14, wherein distribution of the aggregates calculated in the first stage to processing units for performing aggregate calculation in the second stage is based on application of a function on a variable that is incremented through a range of values that represent corresponding column combinations.

16. An article comprising at least one non-transitory computer-readable storage medium storing instructions that upon execution by one or more processors of a database system cause the database system to:

receive a request to calculate aggregates of multiple combinations of a given set of columns, wherein each aggregate is requested to be calculated from a respective column combination of the multiple column combinations;

identify plural groups of the processing units, wherein each of the groups includes a respective subset of the processing units, and wherein the number of plural groups is based on a total number of the multiple column combinations of the given set of columns, a number of the plurality of processing units, and a size of cache memory per processing unit;

determine a predetermined number of passes to calculate the aggregates by each of the groups, wherein the number is one or greater, wherein the predetermined number of passes is determined prior to calculation of the aggregates by each of the groups;

within each of the groups, replicate data of each processing unit in the group to other one or more processing units in the group; and within each of the groups, calculate aggregates of at least some of the multiple column combinations of the given set of columns by the processing units in the group using the replicated data.

17. The article of claim 16, wherein calculating the aggregates is part of a first aggregation stage.

18. The article of claim 17, wherein the instructions upon execution cause the database system to further send the aggregates calculated in the first aggregation stage by each of the processing units to another one of the processing units to perform a second aggregation stage by the another processing unit.

19. The article of claim 16, wherein determination of the number of passes is based on a cache size available to each of the processing units, a number of the column combinations for which aggregates are calculated, and a number of the processing units.

* * * * *